United States Patent
Takahashi et al.

(10) Patent No.: US 6,632,469 B1
(45) Date of Patent: Oct. 14, 2003

(54) PECTIN, METHOD FOR ITS PRODUCTION, ACIDIC PROTEIN FOODS INCORPORATING IT AND METHOD FOR THEIR PRODUCTION

(75) Inventors: Taro Takahashi, Ibaraki (JP); Hitoshi Furuta, Ibaraki (JP); Junko Tobe, Ibaraki (JP); Ryosuke Kiwata, Ibaraki (JP)

(73) Assignee: Fuji Oil Co., Ltd., Osaka (JP)

( * ) Notice: Subject to any disclaimer, the term of this patent is extended or adjusted under 35 U.S.C. 154(b) by 0 days.

(21) Appl. No.: 09/581,032

(22) PCT Filed: Nov. 16, 1999

(86) PCT No.: PCT/JP99/06398

§ 371 (c)(1),
(2), (4) Date: Jun. 6, 2000

(87) PCT Pub. No.: WO00/43424

PCT Pub. Date: Jul. 27, 2000

(30) Foreign Application Priority Data

Jan. 19, 1999 (JP) ................................................ 11-9984
Sep. 3, 1999 (JP) ............................................ 11-249464

(51) Int. Cl.[7] .............................. A23F 5/00; A23J 1/00; A23L 1/28
(52) U.S. Cl. .................. 426/594; 426/655; 426/656
(58) Field of Search ................. 426/594, 655, 426/656, 658

(56) References Cited

U.S. PATENT DOCUMENTS 4,672,034 A * 6/1987 Rombouts et al.
5,008,254 A * 4/1991 Weibel
5,656,734 A   8/1997 Ehrlich
6,024,959 A * 2/2000 Bachmann

FOREIGN PATENT DOCUMENTS

| EP | 0426434 A1 | 5/1991 |
| EP | 0958746 A1 | 11/1999 |
| JP | 59-102355 * | 6/1984 |
| JP | 60-133002 | 7/1985 |
| JP | 60-161401 | 8/1985 |
| JP | 3-157403 | 7/1991 |
| JP | 4-36142 * | 2/1992 |
| WO | WO 97 49298 A | 12/1997 |

OTHER PUBLICATIONS

Database Abstract. FSTA. An: 75(06):L0533. Starke,. 1974. 26 (12) pp. 417–421. Authors: Abousteit et al.*
Database Abstract. FSTA. An: 79(03):T0132. Zucker– und Susswarenwirtschaft, 1978 31 (9) pp. 348, 350–351. Authors: Gschwend et al.*
Food Hydrocolloids. 13. !999. pp. 255–262. Authors: Turquois et al.*
Database WPI—Section Ch, Week 9813, Derwent Publications Ltd., London, GB; AN 1998–138165 XP00219316 JP 10014494 A (Nitta Gelatin K.K), Jan. 20, 1998 *Abstract*.

* cited by examiner

*Primary Examiner*—Anthony J. Weier
(74) *Attorney, Agent, or Firm*—Paul & Paul

(57) ABSTRACT

A method for production of pectin that includes hot water extraction from a root vegetable under weak acidic conditions of pH 3.8–5.3 and pectin produced by the method, as well as a method for production of acidic protein food products that includes addition of the pectin to acidic protein food products, and acidic protein food products produced by the method.

9 Claims, No Drawings

US 6,632,469 B1

PECTIN, METHOD FOR ITS PRODUCTION, ACIDIC PROTEIN FOODS INCORPORATING IT AND METHOD FOR THEIR PRODUCTION

TECHNICAL FIELD

The present invention relates to pectin and a method for its production, as well as to acidic foods incorporating it and to a method for their production. More specifically, the present invention relates to pectin obtained from root vegetables and especially potatoes, to a method for its production, to acidic foods such as acidic protein drinks, acidic dairy beverages, acidic frozen desserts and acidic desserts obtained by adding citrus juices or other fruit juices, organic acids or inorganic acids to protein drinks such as milk and soy milk, as well as coffee beverages, lactic acid bacteria beverages, liquid yogurt and the like, and to a method for their production.

BACKGROUND ART

Root vegetables, and potatoes in particular, have long been known to contain pectin substances in combination with starch (Ullmanns Enzyklopaedie der techn. Chemie, Bd. 13, 171, Urban & Schwarzenberg, Muenchen-Berlin (1962)), and many studies have been carried out on their use as raw materials for production of pectin (Die Staerke 26 (1974) 12, 417–421, CCB 3, 1(1978) 48–50; Getreide Mehl und Brot. 37, 5(1983) 131–137; Japanese Unexamined Patent Publication SHO No. 60-161401; Chem. Eng. Technol. 17(1994) 291–300; WO 97/49298). Research has also been carried out for years on its uses, with most studies focusing on its use as a gelling agent (ZSW Bd. 31(1978) H.9 348–351, Getreide Mehl und Brot 37, 5(1983) 131–137, WO 97/49298).

As mentioned above, production of pectin from potatoes has long been studied as a research topic. However, in terms of its function as a gelling agent for jams and the like that has been examined as a major use, it has not excelled over pectin derived from fruits such as apples and citrus fruits, and its use has therefore not been practical to date. The uses and production methods for fruit-derived pectin have therefore been studied, but there has been virtually no research to date on the unique functions or detailed production conditions for pectin derived from root vegetables, and potatoes in particular.

Production of acidic protein foods has traditionally employed apple- and citrus fruit-derived pectin, water-soluble soybean polysaccharides, carboxymethylcellulose sodium, propyleneglycol alginate and the like for the purpose of preventing aggregation and precipitation of protein particles. However, when using any of these stabilizers, dispersion of the protein can only be satisfactorily stabilized in a pH range below the isoelectric point of the protein, and a problem has existed in that there are no stabilizers that can stabilize acidic protein foods in the acidic pH range exceeding the isoelectric point.

On the other hand, it has been reported that in the weakly acidic pH range of from neutral to pH 5.2, addition of an organic acid salt can stabilize the protein components (Japanese Examined Patent Publication HEI No. 5-52170), but even with this proposal the emulsifying property of the stabilized protein solution is lost, and the effect of the added organic acid salt makes it impossible to achieve satisfactory acidity.

In addition, lactoproteins in acidic dairy beverages such as "yogurt drinks", lactic acid bacteria beverages and fruit-added milk are extremely unstable, such that the lactoproteins aggregate and with passing time produce lactoprotein precipitates, resulting in separation of the whey. Upon heat sterilization, the aggregates become notable resulting in total loss of the product value.

Also, dairy component-added coffee, for example, that is transportable at ordinary temperature, has traditionally been produced through a procedure whereby the raw materials such as coffee extract, dairy components, sugars, emulsifiers, etc. are mixed and dissolved to make a coffee preparation, and then passed through a homogenizer and heated to 110–135° C. for sterilization, either before or after packing into a storage container; however, the high temperature of the heating step causes a decomposition reaction of the coffee components, and lowers the pH of the coffee solution. Thus, when the pH of the solution is lowered, giving it an acidity of pH 6.0 or below, the lactoproteins in the dairy components contained in the coffee solution are denatured resulting in separation and aggregation, so that the product value is lost. In order to prevent denaturation of the lactoproteins, an alkali substance such as sodium bicarbonate is often added beforehand to the coffee solution to adjust the pH of the coffee solution to greater than pH 6.5 prior to the heating step, but since dairy component-added coffee prepared by such a method is heat sterilized with the pH at greater than 6.5, the aroma of the coffee is altered, resulting in the characteristic aroma and flavor of retorted can coffee which is different from the original regular coffee.

On the other hand, there is a strong demand for development of heat-sterilized dairy component-added coffee beverages that can be stored at ordinary temperature and still have excellent taste with acidity, and methods for production of dairy component-added coffee beverages with acidity have been proposed such as a method of using fresh cream, butter or the like as dairy components and adding emulsifiers such as sucrose fatty acid esters and crystalline cellulose (Japanese Unexamined Patent Publication HEI No. 6-245703) and a method of using acidic polysaccharides to stabilize the lactoproteins (Japanese Unexamined Patent Publication SHO, No. 62-74241); however, none of these methods have been successful at stabilizing dairy components without losing the unique coffee taste and properties.

Thus, because coffee exhibits the characteristic aroma and acidity of regular coffee in a weak acidic pH range of pH 6.5 and below, a problem occurs when the pH of a coffee solution is modified during preparation and is kept at above pH 6.5 as it loses the characteristic aroma and acidity of regular coffee, while the coffee obtained upon heat sterilization undergoes a drastic deterioration in taste as compared to the original regular coffee. In other words, no technique has existed in the prior art that can stabilize dairy components over long periods in order to avoid losing the characteristic taste and properties of regular coffee.

As mentioned above, there exist techniques for achieving stabilization of protein dispersion in the pH range below their isoelectric point and in the pH range of from pH 5.2 to neutral, but at the current time there is no technique available that can satisfactorily stabilize acidic protein foods in a general pH range of higher acidity than the protein isoelectric point.

DISCLOSURE OF THE INVENTION

It is an object of the present invention to provide a unique pectin obtained from root vegetables, and potatoes in particular, and to a method for its production, as well as acidic protein foods that are stable in an acidic pH range above the isoelectric point of the protein and a method for their production, in order to thereby provide heat sterilized dairy component-added beverages that have stable dairy components over long periods and that can be transported at ordinary temperature. Here, "acidity" will refer to the pH range of 6.5 and lower.

As a result of diligent research aimed at overcoming the problems mentioned above, the present inventors have found that a unique function is expressed by pectin obtained by hot water extraction under weak acidic conditions from starch pulp as a processing by-product of potatoes. In particular, it was discovered that using white potato-derived pectin allows acidic protein foods to be satisfactorily stabilized in a pH range above the isoelectric point of the protein, at a lower viscosity than with fruit-derived pectin. The present invention has been completed on the basis of this discovery.

The present invention therefore provides a method for production of pectin that comprises hot water extraction from root vegetables under weak acidic conditions of pH 3.8–5.3 and pectin produced by the method, as well as a method for production of acidic protein foods comprising addition of this pectin to acidic protein foods, and acidic protein foods produced by the method.

BEST MODE FOR CARRYING OUT THE INVENTION

According to the invention, the root vegetables as raw materials for extraction of pectin may be, for example, potatoes such as white potatoes, sweet potatoes, taros, yams, konjak, etc. or burdocks, carrots, Japanese radishes, lotuses, beets and the like, but potatoes are particularly preferred. These potatoes may be used directly either in raw or dried form, but it is preferred to use the raw or dried starch pulp produced as a processing by-product from starch production.

The extraction of pectin from the raw material must be carried out under weak acidity of from pH 3.8 to pH 5.3. Pectin extracted outside of this pH range does not exhibit the protein dispersion-stabilizing function exhibited in a pH range above the isoelectric point.

Incidentally, while the reason for this exhibited function of pectin extracted in the aforementioned pH range cannot be explained in full detail, it is surmised that it probably has to do with the degree of esterification of the polygalacturone chains and the three-dimensional structure of the neutral sugar chains in the extracted pectin.

The extraction of pectin in this pH range is preferably carried out at a temperature of 100°C. or higher. When the extraction is carried out at a temperature of below 100° C., more time is required for elution of the pectin and an economical disadvantage is therefore presented. On the other hand, extraction at higher temperature can be completed in a shorter period, but if the temperature is too high an adverse effect may be produced on the flavor and color tone while the pectin will be converted to a lower molecular weight thus reducing the effect exhibited by its function, and therefore the temperature is preferably no higher than 130° C.

The purity of the pectin of the invention may be increased by removing the contaminating starch substances, to allow stronger expression of the function. The contaminating starch substances are preferably present at no greater than 60%, and more preferably no greater than 50%, based on the measured content by quantitation using enzymes. The starch substances may be removed by a publicly known method, and as an example there may be mentioned decomposition by enzymes, washing removal from the raw material using water at 100° C. or below, and separation of the insoluble portion in the extract. Pectin with any molecular weight value may be used, but it preferably has an average molecular weight of from a few tens of thousands to a few million, and more specifically from 50,000 to 300,000. The average molecular weight of the pectin is the value determined by the limiting viscosity method which measures the viscosity of a 0.1 molar $NaNO_3$ solution using standard pullulan (Showa Denko, KK.) as the standard substance.

The pectin derived from root vegetables, and particularly potatoes, obtained according to the invention has a unique function differing from conventional pectin derived from fruits such as apples or citrus fruits. Specifically, while the function of fruit-derived pectin that can stabilize protein dispersion in a pH range below the isoelectric point is utilized to provide a stabilizer for acidic dairy beverages, the pectin of the invention has a function that can stabilize protein dispersion in a pH range above the isoelectric point, and this function therefore allows production of acidic protein foods that are stable in a pH range above the isoelectric point, which have not been obtainable according to the prior art.

The acidic protein foods of the present invention are acidic foods containing animal and vegetable proteins, and they include protein products with acidity, for example, acidic protein beverages obtained by adding citrus juices or other fruit juices, organic acids such as citric acid or lactic acid, or inorganic acids such as phosphoric acid, to beverages using animal and vegetable proteins, such as milk and soy milk; acidic dairy beverages obtained by rendering dairy products acidic; acidic frozen desserts such as acidic ice cream or frozen yogurt obtained by adding fruit juices or the like to frozen desserts containing dairy components; acidic desserts obtained by adding fruit juices or the like to gelled foods such as pudding and Bavarian cream, as well as coffee beverages, lactic acid bacteria beverages (including live bacteria and pasteurized types), fermented milk (in solid or liquid form), and the like. "Animal and vegetable proteins" refers to cow milk, goat milk, skim milk, soy milk and their powdered forms of whole powdered milk, skim powdered milk and powdered soy milk, as well as sweetened milk to which sugar has been added, concentrated condensed milk, processed milk fortified with minerals such as calcium or vitamins, and fermented milk and to proteins derived therefrom. "Fermented milk" refers to fermented milk obtained by sterilizing the aforementioned animal or vegetable protein and then adding a lactic acid bacteria starter for fermentation, but if desired this may be powdered, or sugar may be added thereto.

The amount of the pectin of the invention used may be, as a standard, about 0.05–10 wt % and preferably 0.2.–2 wt % with respect to the final product, but this may be varied depending on differences in the protein concentration, and therefore the amount thereof used is not restricted for the invention.

For the production of acidic protein foods according to the invention, stabilizers common to the prior art may also be used, for example, pectin derived from apples or citrus fruits, water-soluble soybean polysaccharides, carboxymethylcellulose sodium, propyleneglycol alginate, carrageenan, microcrystalline cellulose, chitosan, organic acid salts, polyphosphate salts, emulsifiers, heat denatured proteins and the like, which can further widen the stable pH range.

The present invention will now be explained in greater detail by way of examples, which are only illustrative and are not intended to limit the scope of the invention in any way. Throughout the examples, the parts and percentages are based on weight.

EXAMPLE 1

After suspending 500 g of dried purified potato starch pulp (product name: POTEX, LYCKEBY STARKELSEN Co., 5% moisture content, 7% starch content (solid portion)) in 9500 g of water and dividing this into 1000 g portions, their pH values was adjusted to 2.0, 3.0, 3.5, 4.0, 4.5, 5.0, 5.5., 6.0, 7.0 and 8.0, and this was followed by heating at 120° C. for 3.0 minutes to extract the pectin. After cooling, centrifugal separation (10,000 g×30 minutes) was carried out to separate out a pectin extract solution and a precipitate. An equivalent weight of water was added to the separated precipitate and after further centrifugal separation the supernatant solution was combined with the previous pectin extract solution and this mixture was lyophilized to obtain each crude pectin sample (15% starch content (solid portion)). Each of the recovered crude pectin samples was used to prepare a mixture with the composition shown in Table 1, and the protein dispersion stabilizing function was evaluated at pH 5.0.

TABLE 1

Mixture for evaluation of protein dispersion stabilizing function at each extract pH

| | |
|---|---|
| Pectin solution, (1% solution) | 20 parts |
| Sucrose solution (35% solution) | 10 parts |
| Milk | 20 parts |
| Prepared to pH 5.0 with citric acid solution (50% solution) | |

Specifically, 20 parts of a 1% pectin solution, 10 parts of a 35% sucrose solution and 20 parts of milk were mixed while cooling, and then a 50% citric acid solution was added dropwise to adjust the pH to 5.0, and the condition of the mixture was observed. The results of this evaluation are shown in Table 2.

TABLE 2

| Prepared pH before heat extraction | Pectin extract pH | Acidic milk condition |
|---|---|---|
| pH 2.0 | pH 2.05 | considerable coagulation |
| pH 3.0 | pH 2.98 | coagulation |
| pH 3.5 | pH 3.41 | coagulation |
| pH 4.0 | pH 3.82 | stable |
| pH 4.5 | pH 4.39 | stable |
| pH 5.0 | pH 4.82 | stable |
| pH 5.5 | pH 5.31 | some coagulation |
| pH 6.0 | pH 5.39 | considerable coagulation |
| pH 7.0 | pH 5.57 | considerable coagulation |
| pH 8.0 | pH 6.39 | considerable coagulation |

As shown in Table 2, it was confirmed that with potato starch pulp-derived pectin, a protein dispersion stabilizing function at pH 5.0 was exhibited when the extract pH was in the range of 3.8 to 5.3.

COMPARATIVE EXAMPLE 1

The procedure of Example 1 was repeated except for using squeezed apple juice pulp (product name: Apple Fiber, Nitro Co., 5% moisture content) instead of raw pectin extract, and the protein dispersion stabilizing function at pH 5.0 was observed for the fruit-derived pectin.

TABLE 3

| Prepared pH before heat extraction | Pectin extract pH | Acidic milk condition |
|---|---|---|
| pH 2.0 | pH 1.99 | considerable coagulation |
| pH 3.0 | pH 2.98 | considerable coagulation |
| pH 3.5 | pH 3.38 | considerable coagulation |
| pH 4.0 | pH 3.71 | considerable coagulation |
| pH 4.5 | pH 4.09 | considerable coagulation |
| pH 5.0 | pH 4.35 | considerable coagulation |
| pH 5.5 | pH 4.51 | considerable coagulation |
| pH 6.0 | pH 4.63 | considerable coagulation |
| pH 7.0 | pH 5.22 | considerable coagulation |
| pH 8.0 | pH 6.19 | considerable coagulation |

As shown in Table 3, with the fruit-derived pectin, no protein dispersion stabilizing function at pH 5.0 was found regardless of the extract pH.

EXAMPLE 2

Preparation of Pectin (a)

After suspending 500 g of dried purified potato starch pulp (product name: POTEX, LYCKEBY STARKELSEN Co., 5% moisture content, 7% starch content (solid portion)) in 9500 g of water, the pH was adjusted to 4.5 with hydrochloric acid and this was followed by heating at 120° C. for 30 minutes to extract the pectin. After cooling, centrifugal separation (10,000 g×30 minutes) was carried out to separate out a pectin extract solution and a precipitate. An equivalent weight of water was added to the separated precipitate and after further centrifugal separation the supernatant solution was combined with the previous pectin extract solution and dried to obtain pectin (a).

EXAMPLE 3

Preparation of Pectin (b)

A pectin extract solution obtained in the same manner as Example 2 was passed through an active carbon column for purification treatment and then dried to obtain pectin (b).

EXAMPLE 4

Preparation of Pectin (c)

After suspending 50 g of unpurified dried potato starch pulp (10% moisture content, 36% starch content (solid portion)) in 950 g of water, the pH was adjusted to 4.5 with hydrochloric acid and this was followed by heating at 120° C. for 30 minutes to extract the crude pectin (74% starch content (solid portion)). After cooling, centrifugal separation (10,000 g×30 minutes) was carried out to separate out a pectin extract solution and a precipitate. An equivalent weight of water was added to the separated precipitate and after further centrifugal separation the supernatant solution was combined with the previous pectin extract solution and the mixture was allowed to stand at 5° C. for 12 hours, and this was followed by further centrifugal separation at 10,000 g for 10 minutes, removal of the insolubilized starch substance and then drying to obtain pectin (c).

EXAMPLE 5

Preparation of Pectin (d)

Starch carbohydrase (product name: Amyloglucosidase, Novo Co.) was added to the crude pectin solution obtained in Example 4 to 40 units (with 1 unit defined as the amount of enzyme decomposing 1 μmol of maltose in one minute), and allowed to act for one hour at 50° C. After completion of the reaction, heat treatment was effect at 90° C. for 10 minutes to deactivate the enzyme, and ethanol was added to 80% alcohol concentration to the saccharified solution obtained by filtration, for precipitate purification treatment. The recovered precipitate was dried to obtain pectin (d).

The analysis results for each of the pectins obtained above are summarized in Table 4. Measurement of the total sugars was accomplished by the phenolsulfuric acid method, measurement of uronic acid was accomplished by the Blumenkrantz method and measurement of the starch content was accomplished by measurement of the reducing end by the Somogyi-Nelson method after enzyme decomposition. The average molecular weight is the value determined by the limiting viscosity method which measures the viscosity of a 0.1 molar $NaNO_3$ solution using standard pullulan (Showa Denko, KK.) as the standard substance.

TABLE 4

| Components | Compositional ratios (%) | | | |
| --- | --- | --- | --- | --- |
| | Example 2 (a) | Example 3 (b) | Example 4 (c) | Example 5 (d) |
| Moisture content | 7.4% | 8.3% | 5.4% | 6.6% |
| Crude protein | 6.6% | 4.5% | 1.3% | 0.4% |
| Crude ash | 8.5% | 10.0% | 1.6% | 2.3% |
| Total sugars | 74.1% | 73.9% | 87.0% | 86.8% |
| Uronic acid | 26.2% | 24.7% | 25.9% | 32.0% |
| Starch | 15.2% | 16.1% | 37.2% | 1.8% |
| Average molecular weight | 105,000 | 119,000 | 158,000 | 173,000 |

EXAMPLE 6

When each of the obtained pectins (a)–(d) were used for confirmation of the protein dispersion stabilizing ability at pH 5.0 in the same manner as Example 1, all exhibited satisfactory dispersion stabilization.

COMPARATIVE EXAMPLE 2

After suspending 50 g of unpurified dried potato starch pulp (10% moisture content, 36% starch content (solid portion)) in 950 g of water, the pH was adjusted to 4.5 with hydrochloric acid and this was followed by heating at 120° C. for 30 minutes to extract the crude pectin. After cooling, centrifugal separation. (10,000 g×30 minutes) was carried out to separate out a pectin extract solution and a precipitate. An equivalent weight of water was added to the separated precipitate and after further centrifugal separation the supernatant solution was combined with the previous pectin extract solution and the mixture was dried to recover the crude pectin (74% starch content (solid portion)). The recovered crude pectin was used for confirmation of the protein dispersion stabilizing ability at pH 5.0 in the same manner as Example 1, but coagulation was found in the acidified milk and satisfactory dispersion stabilization was not exhibited.

COMPARATIVE EXAMPLE 3

After suspending 250 g of unpurified potato starch pulp (80% moisture content, 36% starch content (solid portion)) in 750 g of water, the suspension was heated at 120° C. for 30 minutes at pH 5.8, without pH adjustment, to extract the crude pectin. After subjecting this crude pectin to starch carbohydrase treatment in the same manner as Example 5, it was precipitated with ethanol to recover the pectin. The recovered pectin (2% starch content (solid portion)) was used for confirmation of the protein dispersion stabilizing ability at pH 5.0 in the same manner as Example 1, but considerable coagulation was found in the acidified milk and satisfactory dispersion stabilization was not exhibited.

COMPARATIVE EXAMPLE 4

After suspending 50 g of purified potato starch pulp (product name: POTEX, LYCKEBY STARKELSEN Co., 5% moisture content, 7% starch content (solid portion)) in 950 g of water, the pH was adjusted to 3.3 and this was followed by heating at 110° C. for 60 minutes to extract the pectin, which was then dried. The recovered pectin was used for confirmation of the protein dispersion stabilizing ability at pH 5.0 in the same manner as Example 1, but considerable coagulation was found in the acidified milk and satisfactory dispersion stabilization was not exhibited.

COMPARATIVE EXAMPLE 5

After suspending 50 g of purified potato starch pulp (product name: POTEX, LYCKEBY STARKELSEN Co., 5% moisture content, 7% starch content (solid portion)) in 950 g of a 0.5% sodium hexametaphosphate solution, the pH was adjusted to 3.5 and this was followed by heating at 75° C. for 60 minutes to extract the pectin. The crude pectin solution was then adjusted to pH 2.0 to precipitate the pectin. The recovered pectin was redissolved in water, and then ethanol was added to 80% alcohol concentration for precipitation and purification of the pectin. The recovered pectin was used for confirmation of the protein dispersion stabilizing ability at pH 5.0 in the same manner as Example 1, but considerable coagulation was found in the acidified milk and satisfactory dispersion stabilization was not exhibited.

EXAMPLE 7

After suspending 1 kg of purified potato starch pulp (product name: POTEX, LYCKEBY STARKELSEN Co., 5% moisture content, 7% starch content (solid portion)) in 19 kg of water, the pectin was extracted in the same manner as Example 2. The pectin extract solution was spray dried to obtain crude pectin which was then used as a stabilizer, and the protein dispersion stabilizing function thereof was evaluated at different pH levels with the mixing ratio shown in Table 5.

TABLE 5

| | |
| --- | --- |
| Stabilizer solution (1% solution) | 20 parts |
| Sugar solution (35% solution) | 10 parts |
| Skim powdered milk solution (8% solution) | 20 parts |
| Prepared to pH 4.0–6.5 with citric acid solution (50% solution) | |

Specifically, 20 parts of a 1% stabilizer solution, 10 parts of a 35% sugar solution and 20 parts of an 8% skim powder milk solution were mixed while cooling, and then a 50% citric acid solution was added dropwise to adjust the pH to 4.0, 4.3, 4.5, 4.8, 5.0, 5.3, 5.5, 5.8, 6.0 and 6.5, and a homogenizer was then used for homogenization at 150 kgf/cm² to obtain acidic dairy beverages. The results of evaluating the acidic dairy beverages are summarized in Table 6.

TABLE 6

| Acidic dairy beverage pH | Viscosity (mPa · s) | Condition |
| --- | --- | --- |
| pH 4.0 | 5.9 | considerable coagulation |
| pH 4.3 | 5.2 | coagulation |
| pH 4.5 | 4.6 | slight coagulation |
| pH 4.8 | 3.5 | stable |
| pH 5.0 | 2.9 | stable |
| pH 5.3 | 2.5 | stable |
| pH 5.5 | 2.7 | stable |
| pH 5.8 | 2.4 | stable |
| pH 6.0 | 2.4 | stable |
| pH 6.5 | 2.2 | stable |

As shown in Table 6, it was confirmed that with the dairy beverages using the potato starch pulp-derived pectin as a stabilizer, a protein dispersion stabilizing function was exhibited at low viscosity in the general acidic pH range of over pH 4.6 which is the isoelectric point of lactoprotein.

COMPARATIVE EXAMPLE 6

The procedure of Example 7 was repeated except that the stabilizer used was a commercially-available apple-derived pectin (product name: Classic AM201, Dainihon Seiyaku, KK.), and the stability of the acidic dairy beverages at each pH were evaluated. The results of the evaluation are summarized in Table 7.

TABLE 7

| Acidic dairy beverage pH | Viscosity (mPa · s) | Condition |
| --- | --- | --- |
| pH 4.0 | 7.8 | stable |
| pH 4.3 | 8.8 | stable |
| pH 4.5 | 9.0 | slight coagulation |
| pH 4.8 | 9.5 | coagulation |
| pH 5.0 | 10.1 | considerable coagulation |
| pH 5.3 | 9.6 | considerable coagulation |
| pH 5.5 | 9.7 | considerable coagulation |
| pH 5.8 | 9.4 | considerable coagulation |
| pH 6.0 | 9.5 | considerable coagulation |
| pH 6.5 | 9.5 | considerable coagulation |

As shown in Table 7, with the acidic dairy beverages using the commercially available apple-derived pectin as a stabilizer, no protein dispersion stabilizing function was observed in the general acidic pH range of over pH 4.6 which is the isoelectric point of lactoprotein. Furthermore, even when the protein dispersion stabilized at pH 4.5 and lower, the viscosity was high giving a thick pasty feeling in the mouth.

COMPARATIVE EXAMPLE 7

The procedure of Example 7 was repeated except that the stabilizer used was commercially available trisodium citrate (Kishida Chemicals, KK.), and the stability of each of the acidic dairy beverages at each pH was evaluated. The results of the evaluation are summarized in Table 8.

TABLE 8

| Acidic dairy beverage pH | Viscosity (mPa · s) | Condition |
| --- | --- | --- |
| pH 4.0 | 3.9 | considerable coagulation |
| pH 4.3 | 5.2 | considerable coagulation |
| pH 4.5 | 5.5 | considerable coagulation |
| pH 4.8 | 4.4 | considerable coagulation |
| pH 5.0 | 2.9 | considerable coagulation |
| pH 5.3 | 2.6 | slight coagulation |
| pH 5.5 | 1.8 | stable (transparent) |
| pH 5.8 | 1.7 | stable (transparent) |
| pH 6.0 | 1.7 | stable (transparent) |
| pH 6.5 | 1.7 | stable (transparent) |

As shown in Table 8, with the acidic dairy beverages using the commercially available trisodium citrate as a stabilizer, a protein dispersion stabilizing function was observed in the acidic pH range of over pH 5.3, but the emulsion property was lost in the acidic dairy beverages that were stabilized, such that they lost their product value as dairy beverages.

Preparation of Milk Coffee Beverages (Examples 8–10, Comparative Example 8)

A 500 g portion of medium-roasted ground Colombian coffee beans was extracted with 5 liters of hot water and cooled to below 25° C. to obtain 4.5 liters of a coffee extract solution. Also, 700 g of granular sugar and 3 g of sucrose fatty acid ester were dissolved in 1.3 liters of pure water to obtain a sugar mixture solution. The coffee extract solution and sugar mixture solution were then mixed with the 3% pectin (a) solution and water in the ratios shown in Table 9 below, and after adjusting the total to 1.8 liters, milk was gradually added to bring the total to 2 liters. After thorough mixing, sodium bicarbonate or L-ascorbic acid was used to adjust the pH to 7.0, 6.0 and 5.0, and homogenization was carried out under conditions of 150 kg/cm$^2$ to prepare milk coffee beverages.

TABLE 9

| | Compositional ratios (%) | | | |
| --- | --- | --- | --- | --- |
| | Example 8 | Example 9 | Example 10 | Comp. Ex. 8 |
| Pectin solution (3%) | 400 parts | 400 parts | 400 parts | 0 |
| Coffee extract | 800 parts | 800 parts | 600 parts | 800 parts |
| Sugar mixture | 400 parts | 400 parts | 400 parts | 400 parts |
| Pure water | 200 parts | 200 parts | 200 parts | 600 parts |
| Milk | 200 parts | 200 parts | 200 parts | 200 parts |
| Adjusted pH | 7.0 | 6.0 | 5.0 | 6.0 |

The prepared milk coffee beverages were heated to 95° C. with a plate heater, filled into empty cans and capped shut, and then these canned milk coffee beverages were placed in a retort boiler for retort sterilization under conditions of 121° C. for 30 minutes, to obtain the intended milk coffee beverages. Table 10 shows the results of evaluating the canned milk coffee beverages obtained in the examples and a comparative example. The "Evaluation after hot vendor storage" in the table was by visual observation of the condition of precipitation after storing the milk coffee beverages obtained in the examples and comparative example for 4 weeks in a 60° C. constant temperature zone and then transferring the contents from the cans to beakers. The "coagulation" listed in the column "Evaluation after retort sterilization" or "Evaluation after hot vendor storage" indicates that precipitation of lactoprotein and separation of fat were observed. The organoleptic examination was conducted by checking the acidity, flavor, etc. by an organoleptic test of the obtained milk coffee beverages. For the organoleptic examination, the average scores are shown from 15 panelists (male:female=10:5, age 20:age 30:age 40=6:7:2) participating in the taste test, where 2 points were added when the aroma/acidity resembling regular coffee was very superior, 0 points were ascribed when it was ordinary, and 2 points were subtracted when it was very inferior.

TABLE 10

| | Example 8 | Example 9 | Example 10 | Comp. Ex. 8 |
|---|---|---|---|---|
| Evaluation after retort sterilization | | | | |
| pH | 6.4 | 5.3 | 4.9 | 5.3 |
| Stability | stable | stable | stable | coagulation no product value |
| Organoleptic examination (aroma, acidity) | lacking taste | satisfactory | slightly strong acidity | |
| Organoleptic examination (score) | 0 | 1.8 | 1.2 | — |
| Evaluation after hot vendor storage | | | | |
| Stability | stable | stable | stable | — |

As shown in Table 10, the milk-added coffee prepared without using the pectin of the invention (Comparative Example 8) had dairy component separation and precipitation after retort sterilization, making it impossible to obtain a milk-added coffee beverage with product value. In contrast, when pectin (a) of the invention was used, no lactoprotein coagulating separation was found in a wide pH range even after retort sterilization at 121° C. for 30 minutes, thus confirming its excellent heat resistant stability as well.

INDUSTRIAL APPLICABILITY

According to the present invention, pectin extracted from root vegetables, and potatoes in particular, under weak acidity of from pH 3.8 to pH 5.3 at a temperature of 100° C. or higher has been found to have the unique function of stabilizing protein dispersion in an acidic pH range above the isoelectric point, which function differs from that of conventional stabilizers. This function can be used to produce acidic protein foods that are stable in acidic pH ranges above the isoelectric point, which has not been possible by the prior art. The acidic protein foods that are produced thereby have the added advantage of being storable in a stable condition even after heating by retort sterilization or the like.

What is claimed is:

1. A method for production of an acidic protein food product, the method comprising addition of pectin to an acidic protein food product, the pectin being produced by a method comprising hot water extraction from potato under weak acid conditions of pH 3.8–5.3, wherein the pH of the acidic protein food product is adjusted to above the isoelectric point of the protein used.

2. A method according to claim 1, wherein the temperature of the extraction is 100° C. or higher.

3. The method of claim 1, wherein the potato is a white potato.

4. An acidic food product, the product being produced by a method comprising addition of pectin to an acidic protein food product, the pectin being produced by a method comprising hot water extraction from potato under weak acid conditions of pH 3.8–5.3, wherein the pH of the acidic protein food product is adjusted to above the isoelectric point of the protein used.

5. An acidic food product according to claim 4, wherein the temperature of the extraction is 100° C. or higher.

6. An acidic food product according to claim 4, wherein the potato is a white potato.

7. A coffee beverage containing a dairy component, the beverage being produced by a method comprising addition of pectin to an acidic protein food product, the pectin being produced by a method comprising hot water extraction from potato under weak acid conditions of pH 3.8–5.3, wherein the pH of the acidic protein food product is adjusted to above the isoelectric point of the protein used.

8. A coffee beverage according to claim 7, wherein the temperature of the extraction is 100° C. or higher.

9. A coffee beverage according to claim 7, wherein the potato is a white potato.

* * * * *